United States Patent [19]
Krude

[11] Patent Number: 4,511,344
[45] Date of Patent: Apr. 16, 1985

[54] CARDAN JOINT

[75] Inventor: Werner Krude, Siegburg, Fed. Rep. of Germany

[73] Assignee: Uni-Cardan Aktiengesellschaft, Siegburg, Fed. Rep. of Germany

[21] Appl. No.: 544,461

[22] Filed: Oct. 21, 1983

[30] Foreign Application Priority Data

Oct. 22, 1982 [DE] Fed. Rep. of Germany ....... 3239136

[51] Int. Cl.³ .......................... F16D 3/33; F16D 3/34; F16D 3/36
[52] U.S. Cl. ..................................... 464/139; 464/906
[58] Field of Search ........................ 464/106, 139–146, 464/906

[56] References Cited

U.S. PATENT DOCUMENTS

| | | | |
|---|---|---|---|
| 1,294,583 | 2/1919 | Whisler | 464/143 |
| 2,206,735 | 7/1940 | Stuber | 464/141 X |
| 2,879,651 | 3/1959 | Letc et al. | 464/139 |
| 3,071,943 | 1/1963 | Kings | 464/142 |
| 3,564,867 | 2/1971 | Rethwisch | 464/141 |
| 4,070,872 | 1/1978 | Krude | 464/143 |
| 4,078,400 | 3/1978 | Krude | 464/906 X |
| 4,231,233 | 11/1980 | Krude | 464/144 |
| 4,459,122 | 7/1984 | Rehfeld | 464/143 |

Primary Examiner—John Petrakes
Attorney, Agent, or Firm—Toren, McGeady and Stanger

[57] ABSTRACT

A universal or Cardan joint having a pair of joint members formed as hollow cylinders one smaller than the other, with the smaller cylinder being arranged inside of the larger cylinder and with a centering ball and with a plurality of supporting balls located in engagement between the joint members to provide a joint which will transmit torque but which will be capable of a relatively large angle of articulation.

7 Claims, 18 Drawing Figures

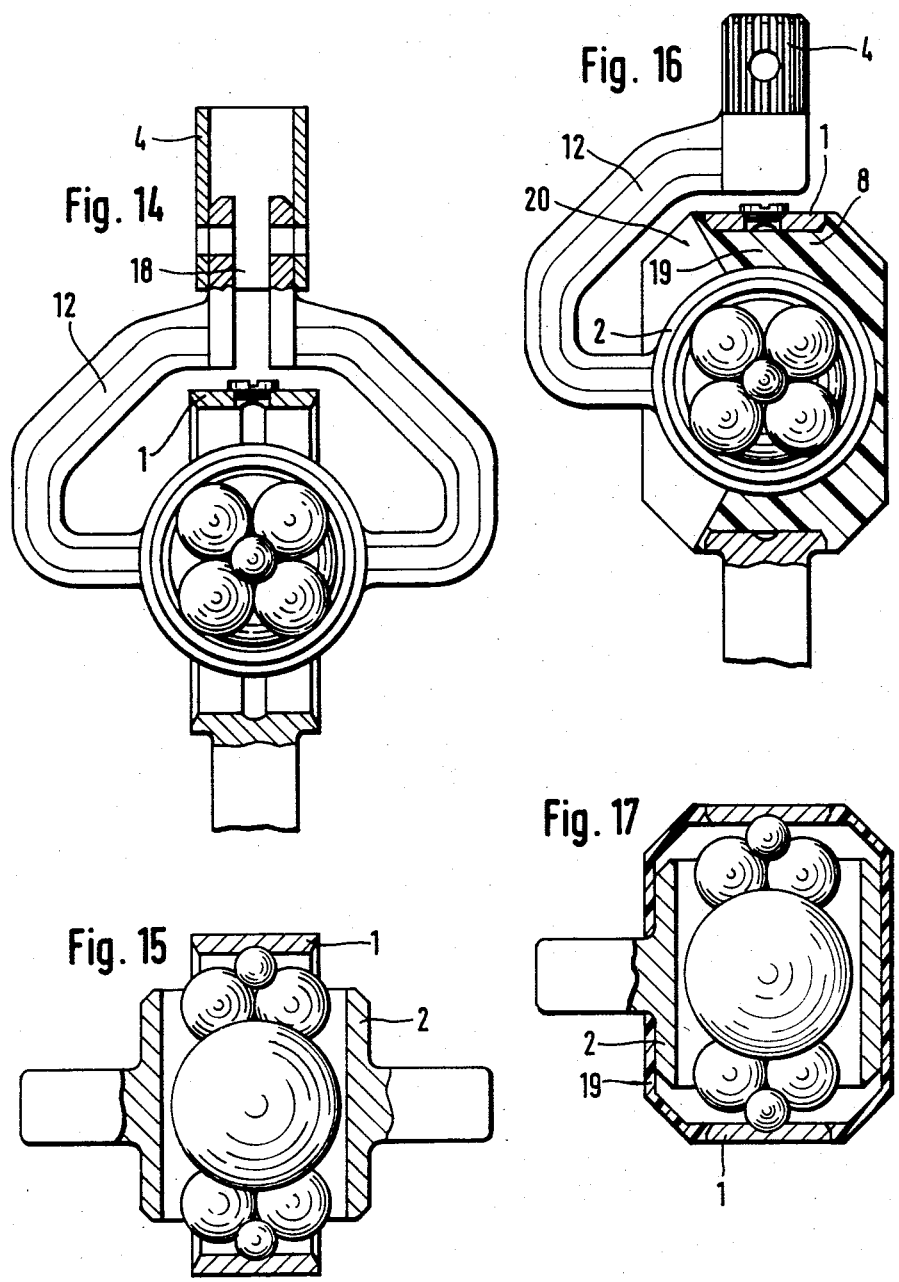

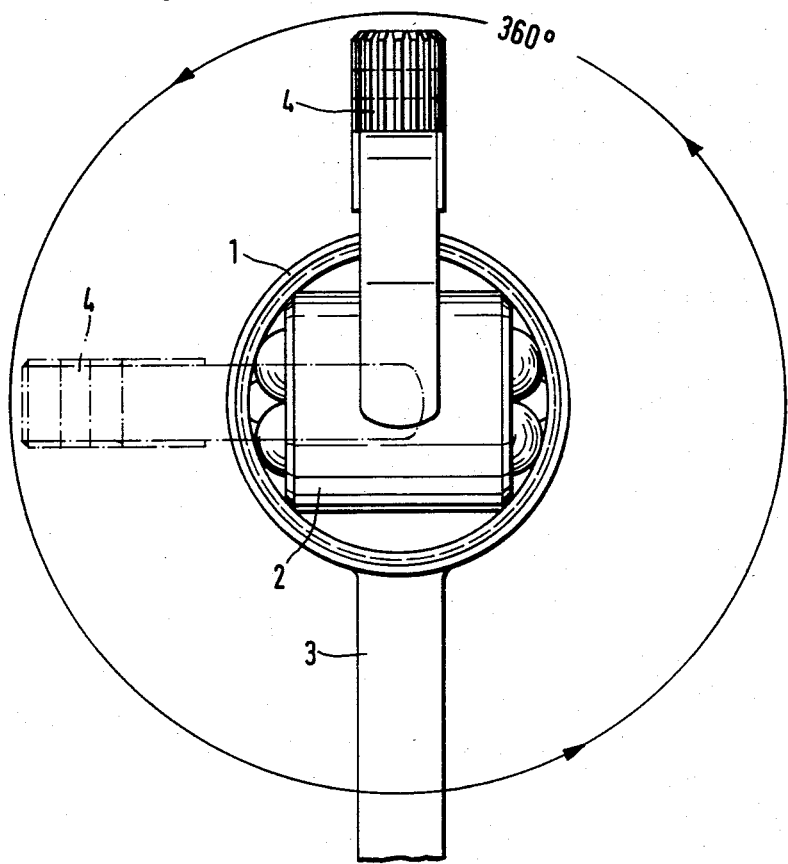

CARDAN JOINT

The present invention relates generally to universal or Cardan joints and more particularly to a joint for transmitting torque while being capable of undergoing a large angle of articulation.

Joints of the type to which the present invention relates usually include a pair of joint members coupled together and a Cardan joint of this type is known in the prior art in U.S. Pat. No. 3,564,867. In such prior art joints, it has been found that a disadvantage arises in that the yoke arms of the joint are affected by high expansion forces which considerably reduce the torque which may be transferred.

A further disadvantage which may arise in such universal joints is that the torque transmitting balls interposed between the joint members will be unable to roll freely in the guiding tracks of the yoke arms so that an increasing sliding friction occur when the joint is articulated. As a result, the efficiency of the joint is considerably reduced and its service life is limited due to a high degree of heat development.

The present invention is therefore directed toward providing a joint which is cost effective for use in devices requiring large angles of articulation, which has a high efficiency and which apart from the connecting members of the two joint parts does not require any bearing means.

SUMMARY OF THE INVENTION

Briefly, the present invention may be described as a universal joint for transmitting torque having a relatively large angle of articulation comprising a pair of joint members coupled together to transmit torque therebetween, said joint members being configured as hollow cylinders one smaller than the other, said one smaller cylinder being arranged inside of said other larger cylinder, and centering means held in engagement between said joint members for maintaining said joint members centered relative to each other, said centering means comprising centering ball means located generally centrally of said joint and supporting ball means located adjacent said centering ball means on opposite sides thereof.

The supporting ball means may comprise a plurality of balls which are arranged in quartets of balls on opposite sides of said centering ball means. The smaller or inner joint member is supported on the cylindrical inner wall of the outer joint member by spherical faces formed on the inner joint member.

An advantage of the joint structure in accordance with the present invention is that two joint members are connected by balls rolling on each other and on the cylindrical walls respectively of the joint members. As the rolling conditions of the joint are quite good, the joint will have a very high efficiency. A high degree of accuracy is required only with respect to the inner bores of the two hollow cylinders forming the joint members which cooperate with the balls and commercially available items will be found to be of sufficient accuracy.

A particular advantage of the joint in accordance with the invention as compared with conventional Cardan joints resides in the fact that the two joint members, at a certain angle of articulation, may be capable of undergoing articulation through an angle of 360° relative to each other. This results in expanding the versatility and capability of the joint and the devices with which it may be used include devices such as manipulators and robot arms, and other similar applications in which conventional joints are not suitable.

The torque is transmitted by one-half of the supporting balls arranged to form a quartet on one side of the centering balls, and via the centering ball to the other half of the supporting balls arranged to form the quartet on the other side of the centering ball. Thus, the inner joint forces always extend through the joint center thereby providing a design which will insure perfect self-centering of the joint under all load conditions.

Additional guiding balls may be provided and held in a guiding track of the outer joint member to axially secure the two joint members relative to each other.

In accordance with a further feature of the invention, the supporting balls may rotate in one guiding track or in guiding tracks arranged in pairs at the cylindrical inner wall of the outer joint member. Such a design will insure a higher transferable torque as compared to point contact existing in present embodiments since the balls are held in line contact in the guiding tracks.

In accordance with a further embodiment of the invention, the inner joint member may be, in turn, provided with a hollow cylindrical insert having an inner bore wherein there is provided several centering balls arranged in a row.

Such a design is particularly useful for large joints in transmitting high torques since otherwise the single centering ball would assume dimensions which would make the entire joint more expensive.

In accordance with a further feature of the invention, both joint parts may be protected against damage by a cover and such a design enables the joint to be protected against penetration of dirt from the exterior thereof.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWINGS

In the drawings:

FIGS. 14 and 15 are sectional views showing another embodiment of the invention wherein a double-sided connection is made between the shaft and the inner joint member;

FIGS. 16 and 17 are sectional views showing a further embodiment of the invention wherein a cover is provided; and FIG. 18 is a view showing the swiveling range of the joint members around the center axis of the outer joint member.

DETAILED DESCRIPTION OF THE PREFERRED EMBODIMENTS

Figure 1:
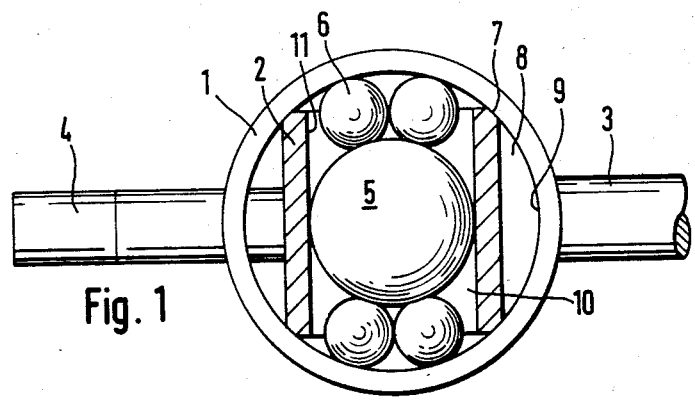
FIG. 1 is a plan view partially in section showing a joint in accordance with the invention.
Figure 2:
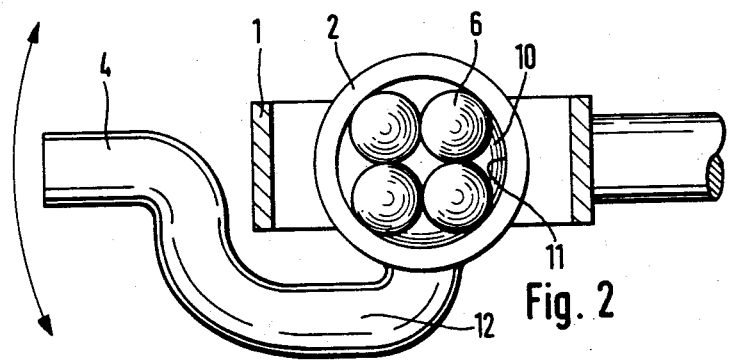
FIG. 2 is a lateral sectional view of the joint shown in FIG. 1.

Referring now to the drawings and more specifically to FIGS. 1 and 2, there is shown a universal joint embodying the invention which consists essentially of an outer joint member 1 formed as a hollow cylinder and an inner joint member 2 which is also formed of a hollow cylindrical configuration. In order to enable the joint to transmit torque, the outer joint member 1 is firmly connected with a shaft 3 and the inner joint member 2 is firmly connected to a shaft 4. In the center of the interior 10 of the inner joint member 2 there is provided a centering ball 5 which, in the embodiment of FIG. 1, is formed with the same diameter as the inner diameter of the smaller or inner joint member 2.

Supporting ball means in the form of a plurality of supporting balls 6 are arranged on opposite sides of the centering ball 5 at the two open ends of the cylinder forming the inner joint member 2. The supporting balls 6 are arranged to comprise two groups of four balls each arranged at each side of the centering ball 5 thereby forming a quartet on either side of the ball 5. The supporting balls 6 are supported both on an inner cylindrical wall 9 of the outer joint member 1 and on an inner cylindrical wall 11 of the inner joint member 2 as well as on the centering ball 5.

The inner joint member 2 is formed with spherical faces 7 arranged on two sides thereof by means of which the inner joint member 2 is supported on the inner cylindrical wall 9 of the outer joint member 1 and whereby the two joint members 1 and 2 are centered relative to each other.

In order to provide permanent lubrication, the interior 8 of the outer joint member 1 and the interior 10 of the inner joint member 2 may be filled with a lubricant such as grease.

FIG. 2 depicts the joint of FIG. 1 from a lateral view and makes clearer the arrangement of the shaft 4 which is fixedly connected to the inner joint member 2 and which is provided with a bent portion 12 which extends about the outer joint member 1.

Figure 3:
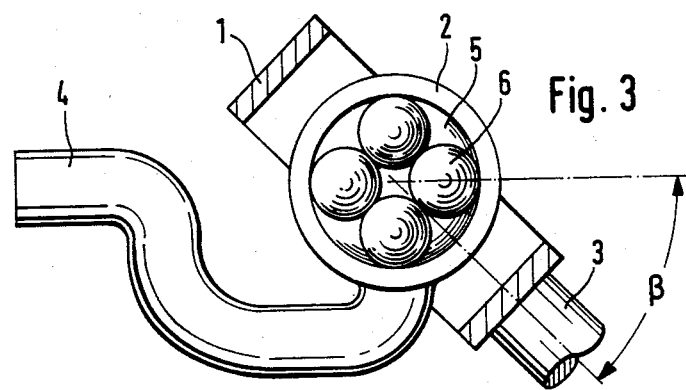
FIG. 3 is a lateral sectional view showing the joint of FIG. 2 in an articulated position.

In FIG. 3, the joint shown in FIG. 2 is shown in its articulated condition and it will be seen that the joint depicted in FIG. 3 has been moved through an angle of articulation $\beta$.

Figure 4:
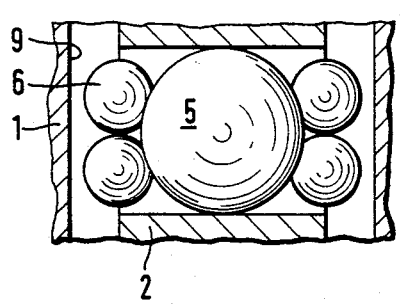
FIGS. 4–9 are each sectional views showing different embodiments of the invention.

FIG. 4 depicts a part of the joint indicating the arrangement wherein the centering ball 5 is formed with the same diameter as the diameter of the inner bore of the inner joint member 2 and wherein the supporting balls 6 are supported on the inner joint member 2, at the outer joint member 1 and at the centering ball 5.

Figure 5:
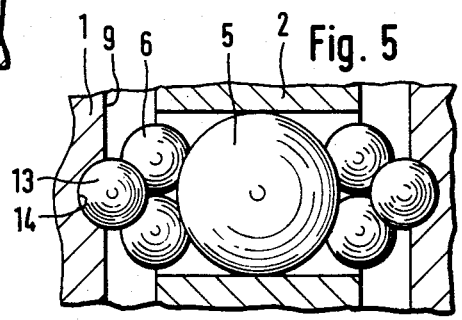

A further embodiment of the invention is shown in FIG. 5 and in this embodiment the supporting balls 6 are supported by means of guiding balls 13 which are arranged in a running track 14 formed on the inner surface of the outer joint member 1.

Figure 6:
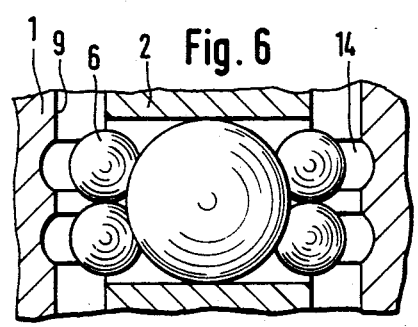

In a further embodiment of the invention as shown in FIG. 6, the supporting balls 6 are held in two running tracks 14 which are arranged at a distance from each other and which are formed on the inner cylindrical wall 9 of the outer joint member 1. The formation of the two running tracks 14 operates to improve the area pressure on the parts of the joint.

Figure 7:
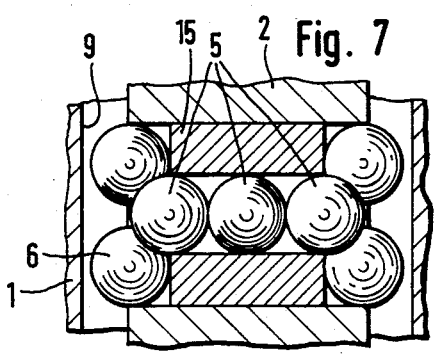

Another embodiment of the invention is depicted in FIG. 7. In the embodiment of FIG. 7, the joint is provided on the inside of the inner joint member 2 with a hollow cylindrical insert 15 within which there are arranged three centering balls 5 aligned in a row and against which there are supported, in turn, the supporting balls 6. The arrangement depicted in FIG. 7 is particularly preferred for larger joints since, in such larger joints, the size of a single centering ball would be relatively large and would thereby also increase the cost for manufacturing the joint.

Figure 8:
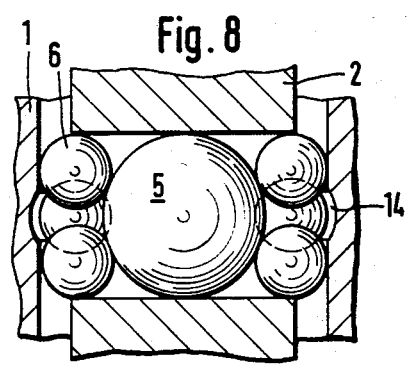

In the embodiment depicted in FIG. 8, the joint is provided with two sets each of four supporting balls arranged as a quartet on either side of the centering ball 5 with two balls in each of the quartets being held in running tracks 14 formed in the inner surface of the outer joint member 1. As compared with the embodiments previously illustrated, the four supporting balls 6 in the embodiment of FIG. 8 are offset by 45°.

Figure 9:
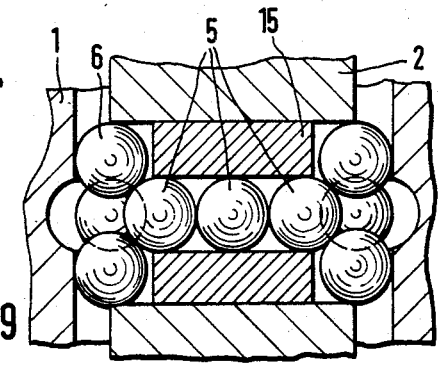

FIG. 9 illustrates a further embodiment of the invention which, in principle, is similar to the embodiment shown in FIG. 8. However, in the embodiment of FIG. 9, a hollow cylindrical insert 15 is provided receiving three centering balls 5.

Figure 10:
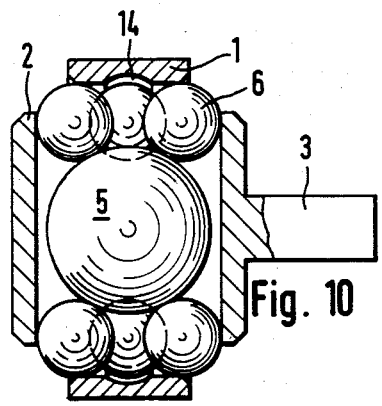
FIGS. 10 and 11 are sectional views showing an embodiment of the invention wherein some of the supporting balls are held in guiding tracks.
Figure 11:
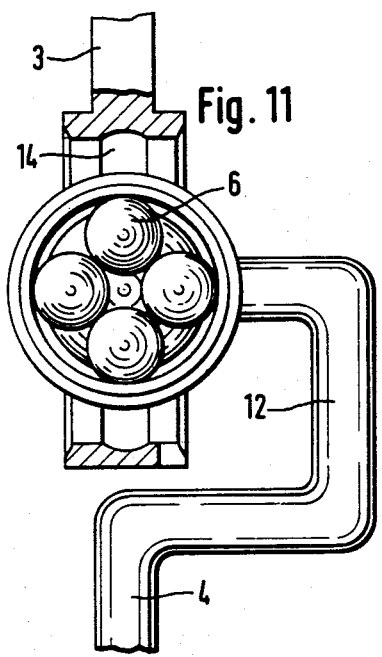

FIGS. 10 and 11 illustrate still another embodiment of the invention, the joint illustrated in FIGS. 10 and 11 being similar to the joint illustrated in FIG. 8, the difference being that the centering ball 5 is formed with a diameter smaller than the diameter of the inner bore of the inner joint member 2. Two each of the four supporting balls 6 arranged on either side of the centering ball 5 are held in the guiding track 4 formed in the inner surface of the outer joint member 1.

Figure 12:
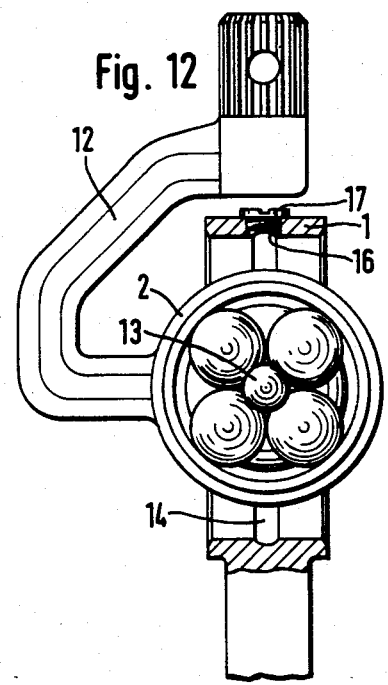
FIGS. 12 and 13 are sectional views illustrating another embodiment of the invention wherein supporting balls are held in guiding tracks via guiding balls.
Figure 13:
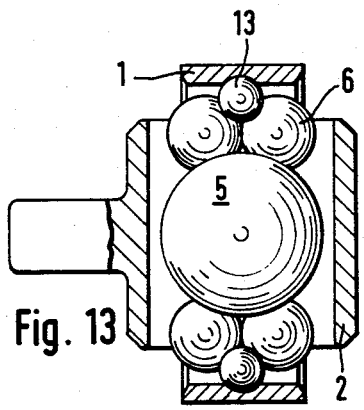

In FIGS. 12 and 13, there is depicted a joint wherein each quartet of supporting balls 6 is supported by guiding balls 13 which, in turn, are held in guiding tracks 14 in the outer joint member 1.

FIGS. 14 and 15 depict two views of a joint where the inner joint member 2 is connected to the connecting shaft 4 by means of two bent portions 12. In order to assemble the embodiment of the joint shown in FIGS. 14 and 15, it is necessary for a slot 18 to be formed at the connecting portion between the two bent portions 12. The slot 18 is formed to be wider than the wall thickness of the outer joint member 1 so that the outer joint member 1 may be passed through the slot 18 for assembly of the embodiment.

FIGS. 16 and 17 indicate an embodiment wherein a joint is protected against penetration by dirt or similar substances. In the embodiment of the joint shown in FIGS. 16 and 17, the interior 8 of the outer joint member 1 is closed, for example, by a plastic cover 19. In order to permit articulation of the inner joint member 2, provision is made for a swivel space 20 to be provided with the outer joint member 1 being rotatable relative to the cover 19.

FIG. 18 depicts the manner in which the inner joint member 2 may be free to swivel or pivot around the cylinder axis of the outer joint member 1. As will be seen from FIG. 18, the inner joint member 2, at a particular angle of articulation, is capable of moving through a rotation or articulation angle of 360°.

Additionally, if the inner joint member 2 were fixed, the outer joint member 1 or the shaft 3 firmly connected thereto, at a particular angle of articulation, would be equally capable of moving through a rotation angle of 360°.

Thus, it will be seen from the foregoing that the present invention will provide an inexpensive joint which has a large angle of articulation and high efficiency characteristics and wherein the two joint members are centered relative to each other exclusively by balls.

In accordance with the invention, the objectives thereof are achieved in that the two joint members are of different size and are configured and designed as hollow cylinders with one being a smaller hollow cylinder forming the inner joint member and being held in the larger hollow cylinder which acts as the outer joint member and with both joint members being centered relative to each other by balls arranged on the interior thereof.

While specific embodiments of the invention have been shown and described in detail to illustrate the application of the inventive principles, it will be understood that the invention may be embodied otherwise without departing from such principles.

What is claimed is:

1. A universal joint for transmitting torque and having a large angle of articulation comprising an inner joint member and an outer joint member coupled together to transmit torque therebetween, said joint members being both configured as hollow cylinders with said inner joint member being smaller than said outer joint member, and with said smaller inner joint member being arranged inside of said larger outer joint member and centering means held in engagement between said joint members for maintaining said joint members centered relative to each other, said centering means comprising centering ball means located generally centrally of said joint and supporting ball means located adjacent said centering ball means on opposite sides thereof.

2. A joint according to claim 1, wherein said supporting ball means comprise a plurality of spherical balls arranged in quartets of four balls on each side of said centering ball means.

3. A joint according to claim 1, wherein said outer joint member comprises an inner cylindrical wall and wherein said inner joint member is formed with spherical faces by which said inner joint member is supported at said cylindrical wall.

4. A joint according to claim 1, further comprising guide track means provided in said outer joint member and guide ball means in rolling contact with said track means, said supporting ball means being arranged to be supported against said outer joint member by said guide ball means.

5. A joint according to claim 1, wherein said outer joint member comprises an inner cylindrical wall having guide track means formed therein, said guide track means including at least one guide track with said supporting ball means including a plurality of supporting balls at least some of which rotate in at least one of said guide tracks.

6. A joint according to claim 1, further comprising a hollow cylindrical insert arranged within said inner joint member and having an inner bore, and wherein said centering ball means comprise a plurality of centering balls arranged in a row within said inner ball of said hollow cylindrical insert.

7. A joint according to claim 1, further comprising cover means for protecting said joint members from exterior deleterious materials.

* * * * *